INVENTOR
GARLAND W. ARCHER

Patented Feb. 6, 1940

2,189,457

UNITED STATES PATENT OFFICE 2,189,457

METHOD AND MEANS FOR ELECTRICAL TESTING

Garland W. Archer, Greenwood, Miss., assignor to Supreme Instruments Corporation Application March 24, 1937, Serial No. 132,722

17 Claims. (Cl. 175—183)

This invention relates generally to an electrical method and apparatus for determining directly the electrical characteristics of electric circuit devices by visual observation.

It has for its principal objects the provision of an improved method and means whereby a cathode-ray oscilloscope may be utilized to indicate directly to the operator and observer the precise nature of the frequency-response characteristic of an electric circuit device, apparatus, or component, and to permit of a ready comparison of such characteristic with the characteristic which the component was designed or intended to possess.

To this end, a method and means are provided for simultaneously producing on the screen of the oscilloscope two frequency-response curve traces of a device under test, the one trace being the mirror image of the other; and for causing both of said traces to appear superposed and centered on said screen when the characteristics of the device under test are such as it was designed or intended to possess; and to be displaced horizontally in opposite directions from the center of the screen and become separately visible when the characteristics of the device under test differ from such desired characteristics. This is accomplished, in part, by imparting to the cathode beam a reciprocating horizontal motion, thus causing it to execute alternate leftward and rightward sweeps across the screen, with great rapidity; and during each said sweep, varying the frequency of a test voltage impressed on the device under test from a lower to a higher value, and producing a vertical deflection of the beam in proportion to the response of the device to this varying-frequency test voltage.

A particular novel two-to-one relation between the frequencies of certain of the various currents and voltages which appear in the circuit arrangement of this invention contributes especially to this end. Simplified means are provided for obtaining and maintaining this frequency relation and for maintaining, in addition, such phase relations between the said voltages and currents as are of assistance in fully realizing the advantages of the invention.

Under the demanding requirements of present-day conditions in the radio and related arts, it is impossible to manufacture on a large scale production basis circuit components such as radio frequency and intermediate frequency coils with such exactness that when connected in the circuits for which they are designed, their performance is precisely what was desired. It is customary, therefore, to test radio receivers containing such components after their manufacture, and sometimes to test the components themselves even after their connection in the receivers with which they are designed to cooperate, by means of testing apparatus which permits the visual observation on a screen of the frequency characteristics of the device under test. If such frequency characteristic is improperly placed horizontally along the frequency axis, showing that the device is mistuned, or if it has an improper shape, showing an improper degree of coupling or other defect, alignment or adjustment of the component or device under test may immediately be made by the operator who at the same time observes on the screen the alteration of the frequency characteristic resulting from his manipulations of the device under test.

A luminous pattern having the shape or form of the frequency characteristic of a selective circuit or the like may be rendered visible on the screen of a cathode-ray oscilloscope by impressing on the device under test a frequency-modulated voltage—that is, a voltage whose frequency varies periodically through a desired range—and causing the response of the device thus energized to produce vertical motion of the cathode beam while the beam is simultaneously moved at a substantially constant rate from left to right in a horizontal direction. When these phenomena are repeated with sufficient rapidity, the impression of a stationary luminous pattern is received by the observer.

In order not to confuse the pattern, it has been usual in the past to cause the spot to execute its return trace, from right to left of the screen, off-scale, or in some other way to conceal it from the observer during its return journey. To produce this result with circuits of a reasonable degree of simplicity has not always been possible, and when the result is imperfectly accomplished, the trace on the screen appears distorted and difficult to interpret.

Moreover, such testing equipment has not in the past been as sensitive as might be desired. By "sensitivity" is meant, in this connection, the capacity of the device to render immediately and strikingly apparent to the observer or operator slight departures of the frequency response characteristic of the device under test from a desired standard. The high-fidelity receiver of the present-day requires a precision of adjustment which may exceed the capabilities of known testing equipment.

By this invention, two response curve traces are formed instead of one, and their positions on the screen are always such that a lateral shift of one from the center of the screen by any amount, indicating mistuning of the device under test, is exactly duplicated by an equal shift of the other in the opposite direction. Thus, for a given amount of mistuning, the two traces are separated by a distance twice as great as the distance of either from the center of the screen, and when the device under test is correctly tuned, the two patterns are centered on the screen. When, as is frequently the case, the response curves are symmetrical, they become, in addition, superposed at the center of the screen, and merge into one. The accuracy with which equal and opposite small lateral shifts of two traces can be observed is substantially twice the accuracy with which a lateral shift of equal magnitude of a single trace can be observed; the accuracy with which superposition can be distinguished from lack of superposition is greater still. It is this increased accuracy which accounts for the improved precision obtainable by the use of this invention. Moreover, the second, or "mirror image" response curve is formed by causing the spot of light to retrace its path on the screen in a certain definite manner, and the complex circuit means heretofore in use for causing the spot to return off-scale are by this invention entirely eliminated, and light conserved. Thus the return of the spot on scale, a source of confusion in devices heretofore known, is by this invention turned to positive advantage.

The details of the invention will be understood from the following description of a preferred form thereof in connection with the drawings, wherein.

Figures 1, 3:
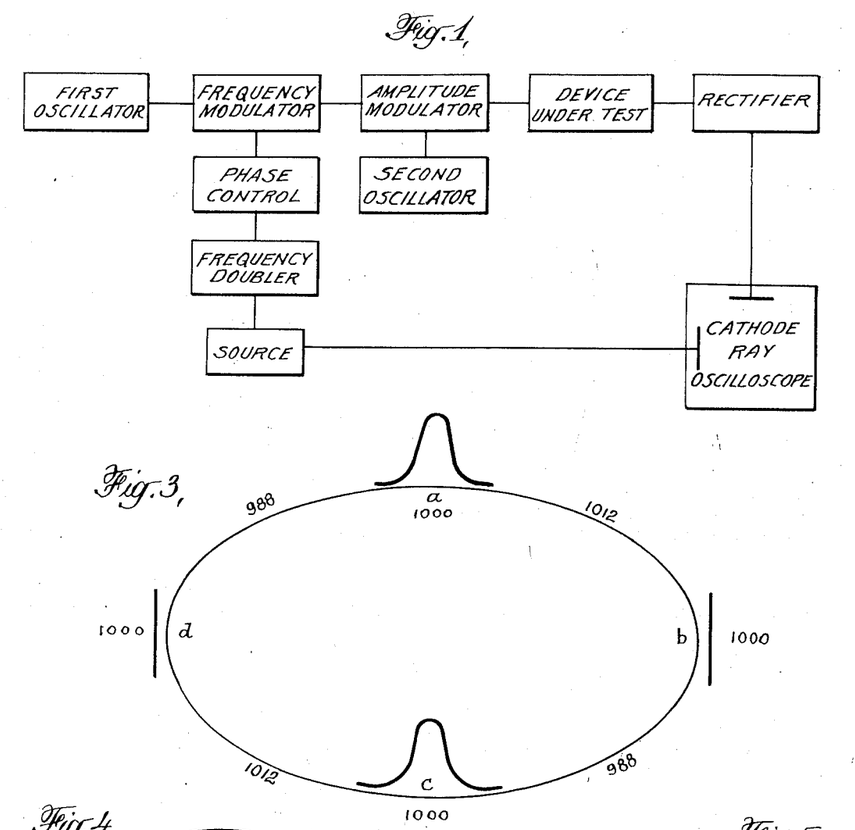
Figure 1 is a functional block diagram illustrating the method of the invention.
Figure 3 illustrates the events which occur during successive portions of a complete cycle in the operation of an embodiment of the invention.

The block diagram of Figure 1 illustrates the method of the invention. The blocks indicate functions rather than circuit components. As will be pointed out hereinafter, a single component of an actual circuit arrangement may perform more than one of the functions of Figure 1, and likewise, two or more components may co-operate to perform one of these functions.

Referring now to Figure 1, in which the characteristics of a device under test are to be investigated by visual observations of luminous trace frequency-response curves on the screen of a cathode-ray oscilloscope, a first oscillator delivers a voltage of frequency $f_1$ to a frequency modulator. A source of low frequency voltage is provided, which may conveniently be the source of local power-frequency voltage. The frequency $f_0$ of this source is doubled synchronously by a synchronous frequency doubler, and the phase of the voltage of doubled frequency $2f_0$ is altered by a phase control device, whereupon this voltage is likewise delivered to the frequency modulator.

The frequency modulator is a device such that, for the two input voltages of frequencies $f_1$ and $2f_0$ its output is a frequency-modulated voltage, that is, one whose mean frequency is $f_1$, but whose instantaneous frequency varies at the rate of $2f_0$ between an upper and a lower limit, being thus alternately greater and less than $f_1$. The limits are determined by the adjustment of the frequency modulator, as those skilled in the art will recognize. The rate of frequency variation $2f_0$ is known in the art as the "wobble" frequency.

The frequency-modulated output of the frequency modulator, which may be symbolized as "$f_1\ m\ 2f_0$" is delivered to an amplitude modulator.

A second oscillator is provided, of type generally similar to the first, but whose generated frequency $f_2$ is manually controllable within wide limits. The output of this second oscillator is delivered to the amplitude modulator.

As is well known, for the two input voltages of frequencies $f_1\ m\ 2f_0$ and $f_2$, the output voltage of the amplitude modulator will contain, besides other components of no interest, an upper and a lower side frequency, namely, $f_1\ m\ 2f_0 + f_2$ and $f_2 - f_1\ m\ 2f_0$. Either one of these frequencies may be employed as the test frequency, the choice being dictated solely by convenience. It has been found convenient to employ the lower one in the preferred embodiment. Exact frequency adjustment of $f_2$ is effected by manual control. If, for example, $f_1$ is 600 kilocycles per second and the electric circuit device under test is to be tested at 1000 kilocycles, the lower side frequency may conveniently be used, and $f_2$ may be adjusted to 1600 kilocycles per second, so that $f_2 - f_1 = 1000$ kilocycles per second.

The output voltage of the amplitude modulator is employed as the test voltage, and its frequency is termed the "test frequency". It is delivered to the device under test whose current response thereto is to be investigated. A voltage proportional to the detected or rectified output current of the device under test is then impressed upon the vertical deflecting elements of a cathode-ray oscilloscope. The deflection in a vertical direction of the cathode beam and therefore the vertical displacement of the spot of light on the screen of the oscilloscope is thus proportional to the instantaneous value of the current through the device under test, which, if the latter comprises a selective circuit, varies with the frequency of the test voltage, $f_2 - f_1\ m\ 2f_0$.

A voltage of frequency $f_0$, derived from said source, is impressed on the horizontal deflecting elements of the oscilloscope, and gives rise to a periodic deflection of the cathode beam, resulting in a reciprocating horizontal motion of the spot of light back and forth across the screen, at the rate $f_0$. This frequency is termed the "time-base frequency".

The actual motion of the spot of light is the resultant of this reciprocating horizontal motion and the more complicated vertical motion above-described, and is in general such as repeatedly to trace out on the screen a closed curve, giving rise, by virtue of persistance of vision in the observer, or otherwise, to the appearance of a pattern. The exact synchronism between the horizontal motion at the rate $f_0$, and the vertical motion at double this rate, namely $2f_0$, is due to the fact that both of these frequencies are derived from the same source, and results in the pattern's appearing to be stationary. Were it not for this automatically maintained synchronism, the pattern might appear to rotate slowly or undergo a continual alteration of shape.

Figure 2:
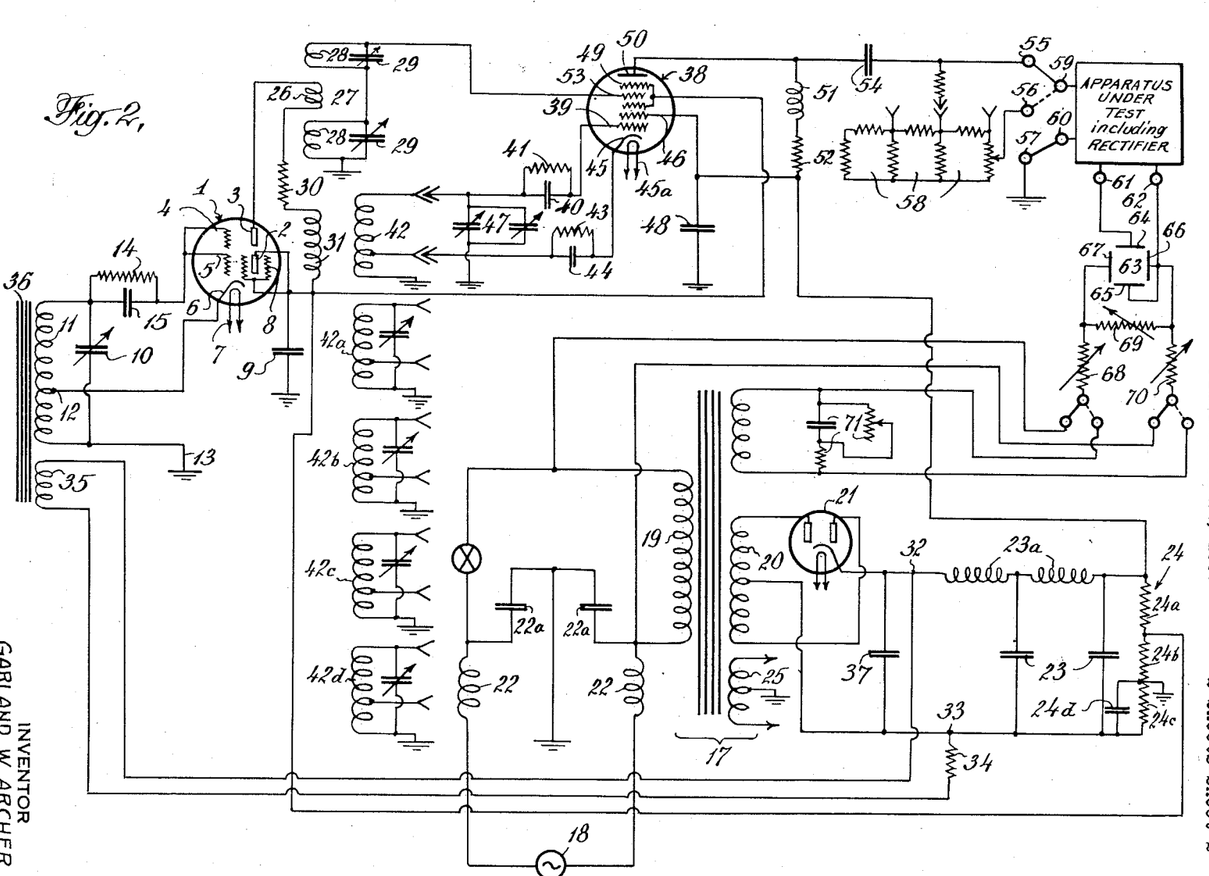
Figure 2 is a complete circuit diagram of a preferred embodiment of the invention.

There will now be described in detail as a preferred embodiment of the invention a circuit arrangement and testing apparatus which has been found to operate successfully. Figure 2 shows such a circuit arrangement.

Referring to Figure 2, 1 is a vacuum tube having two anodes or plates 2, 3, and two control electrodes or grids 4, 5, as well as a cathode 6, a heater 7 and a screen grid 8. As shown, the plate 2, the grids 4 and 5, and the cathode 6 are connected for operation as a Hartley oscillator. Plate 2 and screen-grid 8 are connected together, and connected to ground through blocking condenser 9. A resonant or tank circuit comprising a variable condenser 10 and an inductance coil 11, some point of which, 12, is connected to the cathode 6, is grounded at one end 13. The opposite end of the resonant circuit is connected through a high resistance 14, shunted by a small condenser 15, to the grids 4 and 5, which are connected together. The resistance 14 and condenser 15 assist in the starting of the oscillator and in maintaining the proper grid bias during operation. The frequency of oscillation is determined in large measure by the values of the condenser 10 and the inductance coil 11. Operating potential is supplied to the plate 2 from a suitable point of a voltage divider 24. The cathode 6 is rendered emissive by the heater 7 which may be connected in conventional fashion to a heater winding 25 of the power transformer 17.

The second or coupling plate 3 of the tube 1 is connected through the primary winding 26 of transformer 27 and through resistor 30 and radio frequency choke 31 to plate 2. This arrangement serves as a buffer-coupler, whereby the energy of oscillation generated in the tube 1 may be withdrawn therefrom and impressed on transformer 27 without the disadvantage of having voltages elsewhere generated affect the behavior of the oscillating tube and circuit.

In the lower part of the drawing is shown a conventional full-wave rectifier-filter circuit for the provision of direct current to the voltage-divider 24, and thereby plate potentials to the plates 2 and 3 of tube 1 and to plate and screen-grid electrodes of other tubes. It comprises a double diode rectifier tube 21 supplied from the alternating current source 18 through secondary winding 20 of transformer 17, and chokes 23a and filter condensers 23. To the output terminals 32, 33 of the rectifier, namely, at the points at which the filter is connected to the rectifier tube 21, there is connected a condenser 37, and also, through resistor 34, a winding 35. This winding 35 is wound upon the iron core 36 on which the coil 11 of the oscillator tank circuit is also wound, and is termed a "saturating" or "modulating" winding.

Coupled to the output circuit of this oscillator through transformer 27 is an oscillator-mixer tube 38 which may be a so-called pentagrid converter. The oscillator grid 39 is connected, through grid condenser 40 and grid leak 41 to a replaceable tuning coil 42, the other end of which is grounded. Some point of the coil 42 intermediate its ends is connected through a grid bias resistor 43 to cathode 45. A radio frequency bypass condenser 44 is connected across resistor 43.

Manually adjustable condensers 47 are connected across coil 42. Condenser 40 and grid leak 41 maintain grid 39 and cathode 45 at the potentials required for starting and continuance of radio-frequency oscillations. Grid 46—employed as the oscillator anode—is connected to the high potential end of voltage divider 24, and through bypass condenser 48 to ground. Screen grid 49 is connected to a suitable point on voltage divider 24. Plate 50 is supplied with operating potential through radio-frequency choke 51 and load resistor 52 from the high potential end of voltage divider 24, and is also connected through the choke 51 and the resistor 52 and the bypass condenser 48 to ground.

Replacement coils 42a, 42b, 42c, 42d, and associated tuning condensers may be switched into the grid circuit of tube 38, to replace coil 42 and condensers 47, and so tune to various desired frequency ranges.

The secondary windings 28 of the transformer 27 are connected in series between ground and the control grid 53 of tube 38. Across each winding is a tuning condenser 29. The heater 45a may be connected through leads not shown to the heater winding 25 of the power transformer 17.

Plate 50 is connected through blocking condenser 54 to high potential output terminal 55. A second output terminal 57 is connected to ground. A third output terminal 56 is connected through an attenuation network 58 to terminal 55.

One of the two high potential output terminals 55, 56 and the low potential terminal 57 of the testing apparatus are connected to the input terminals 59 and 60 of the electric circuit device or apparatus under test. On the assumption that the apparatus is a radio receiver, containing amplifier and rectifier circuits, and this is the usual case, its output terminals 61 and 62 are directly connected to the vertical deflecting elements 64 and 65 of the cathode-ray oscilloscope 63.

In the unusual case where the electric circuit device under test is not a radio receiver, a rectifier or detector must be interposed between the output terminals of the device under test and the deflecting elements of the oscilloscope. This condition is illustrated functionally in Figure 1. Furthermore, in the unusual case where the device is not a radio receiver, additional amplification may be required, and an amplifier may be interposed either ahead of the device under test or between it and the vertical deflecting elements of the oscilloscope. Such amplifier and rectifier may be of conventional form; and since in the usual case they will not be required, they have not been shown in Figure 2.

Three variable resistors, 68, 69, 70 are connected in series across primary winding 19 of power transformer 17, and the horizontal deflecting elements 66 and 67 of oscilloscope 63 are connected to resistor 69. If desired, instead of being connected across winding 19, these resistors may be connected to a phase-shifting circuit 71 of conventional design, supplied from power transformer 17.

Primary winding 19 of power transformer 17 is connected through radio frequency chokes 22 to the alternating current power supply 18. Radio frequency bypass condensers 22a are connected in series across winding 19, and their common point is grounded.

The magnitudes and types I prefer to employ for some of the more important components of the circuit arrangement of Figure 2 are given in the following table:

| Component | Reference | Value or description |
|---|---|---|
| First oscillator tube | 1 | Type 6F 7. |
| Second oscillator tube | 38 | Type 6A 7. |
| Rectifier tube | 21 | Type 84. |
| Condensers | 15, 44, 48, 22a | .02 mfd. |
| Grid resistors | 14, 41 | 50,000 ohms. |
| Plate resistors | 30, 52 | 25,000 ohms. |
| Coils | 31, 51, 22 | Radio frequency chokes. |
| Condenser | 9 | 0.03 mfd. |
| Resistor | 43 | 100 ohms. |
| Condenser | 40 | .0003 mfd. |
| Condensers | 47 | 35-365 mmfd. |
| Condenser | 54 | .003 mfd. |
| Attenuator | 58 | |
| Series resistors | | 900-ohms. |
| Parallel resistors | 23a | 100 ohms. |
| Coils | 23a | 35 henrys. |
| Condensers | 23 | 8 mfd. |
| Condenser | 37 | 0.5 mfd. |
| Resistor | 34 | 9000 ohms. |
| Voltage divider | 24 | |
| Resistor | 24a | 3900 ohms. |
| Do | 24b | 31,000 ohms. |
| Do | 24c | 250 ohms. |
| Condenser | 24d | .09 mfd. |

The core 36 is of silicon steel laminations, .0187 inch thick. These laminations are built up into a three-leg core. The winding 11 is placed on the center leg and comprises 99 turns of number 30 double enamel magnet wire. The tap 12 is connected to the 33rd turn. The winding 35 is placed one-half on each of the outer legs, the two portions being connected in series. Each portion comprises seven thousand turns of number 40 enamelled wire.

The frequency of oscillation of the tube 1 of Figure 2 is determined in large measure by the values of the inductance coil 11 and the condenser 10, and is altered by variations thereof. I have found that a suitable inductance variation may be accomplished by alteration of the permeability of an iron core by partial saturation thereof. Thus, the coil 11 is wound upon a ferromagnetic core 36, and its inductance is affected by the current flowing in the coil 35, which is likewise wound upon the core 36. From the manner of its connection at the output terminals 32 and 33 of the rectifier, it will be evident that the winding 35 will carry a current having a considerable direct component and also a considerable component of twice the frequency of the source 18. The alternating component of the rectifier output current is filtered out and reduced to neglible magnitude before reaching the voltage divider 24, but it is undiminished at the terminals 32 and 33, at which points the winding 35 is connected.

The magnitude of the current in winding 35 may be controlled by choice of the resistor 34, and the relative magnitudes of the direct and alternating components thereof are controlled by relative adjustment of resistor 34 and condenser 37. I prefer, however, having chosen proper values for these components, to leave them fixed.

The alternating component of the current in the winding 35 during one half cycle subtracts from and during the following half cycle adds to the direct current component, and the permeability of the iron core 36 is therefore alternately increased above and decreased below its mean value. Since, as above stated, the frequency of oscillation of the tube 1 depends upon the permeability of the core 36, it results that the frequency of the voltage generated by this oscillator tube varies or "wobbles" between an upper and a lower limit. The amount of this wobble is determined in part by the adjustment of resistor 34 and condenser 37. I have found that excellent results may be obtained by the use of a mean frequency of 600 kilocycles per second, wobbling 12 kilocycles on either side; that is, between 588 and 612 kilocycles per second. These conditions are easily obtained with the circuit constants given above. The rate of wobble is equal to the frequency of the alternating current in the winding 35, or precisely twice the frequency of the source 18.

A voltage of this character is termed a frequency-modulated voltage. If the mean frequency of the oscillator tube 1 be $f_1$, and the frequency of the source be $f_0$, the frequency-modulated voltage may be given the symbolic designation "$f_1 \ m \ 2f_0$".

This voltage of frequency $f_1 \ m \ 2f_0$ is received by the coupling plate 3 and impressed, through the medium of transformer 27, whose secondary windings 28 are preferably tuned by condensers 29, on the control grid 53 of the oscillator-mixer tube 38. Grid 39 with its associated circuit, cathode 45, anode 46, coil 42 and condensers 47 comprise an oscillating circuit. The oscillation frequency is determined by the values of the adjustable condensers 47 and the replaceable coil 42, and is manually adjustable between wide limits. The function of the screen-grid 49 is to prevent reflection into transformer 27 and thence into the principal oscillating circuit, tube 1 and associated circuit components, of voltages generated in the tube 38.

Tube 38, in addition to generating its own voltage of controllable constant frequency, mixes or amplitude-modulates therewith the voltage generated by the tube 1 and impressed on grid 53. It then delivers across load resistor 52 and choke 51, and therefore at output terminals 55, 56, 57 of the testing apparatus, a voltage of test frequency $f_2 - f_1 \ m \ 2f_0$. The mean or average value of this test frequency is $f_2 - f_1$; it is controlled by adjustment of condenser 47 and coil 42; and the instantaneous or test frequency varies or wobbles about this mean value between an upper limit and a lower limit at the rate $2f_0$.

This voltage, after whatever amplification may be necessary (amplifier circuits, being wholly conventional and in no sense an essential part of the invention, are omitted from the figure) is next impressed on the input terminals, 59, 60, of the device under test, and the detected or rectified output voltage thereof, appearing between terminals 61 and 62, is impressed upon the vertical deflecting elements 64, 65 of a cathode ray oscilloscope 63.

Referring now again to the functional block diagram, Figure 1, it is evident that in the preferred embodiment above described, the functions of first oscillator and frequency modulator are both performed by the oscillator tube 1 and its associated circuit; that the functions of second oscillator and amplitude modulator are both performed by the oscillator tube 38 and its associated circuit; that the function of the synchronous frequency doubler is performed by connection of the winding 35 to the output terminals 32, 23, of the full wave rectifier; and that the function of the rectifier or detector is in the usual case performed by the apparatus or receiver under test.

Upon the horizontal deflecting elements 66 and 67 of the cathode ray oscilloscope 63 is impressed the time-base voltage of frequency $f_0$, obtained from the same source 18 as that which energizes the modulating winding 35. The magnitude of this voltage is manually controlled by adjustment of the variable resistors 68, 69, 70. Its phase relation to the voltage on the vertical deflecting elements 64 and 65 is governed by the choice of resistor 34 and condenser 37. If desired, a phase-shifting circuit may be interposed between the source 18 and the horizontal deflecting elements 66 and 67. A conventional circuit which answers the purpose is shown at 71. I have found, however, that the resistor 34 and the condenser 37 produce the correct phase relations, and having chosen proper values for these circuit elements, I prefer to leave them fixed.

The phase relationships of the time base voltage $f_0$ to the modulation frequency of the modulated test voltage is preferably chosen to give the sequence of relationships and relative motions on the screen of the cathode ray oscilloscope as described herein. It will be evident, however, that a reversal of the connections to coil 35, or to phasing device 71, or reversal of the wires leading from the primary of the power transformer 19 to the switches at the lower ends of resistors 68 and 70, will result in a 180 degree reversal of these phase relationships, causing the sequence of traces to be formed in the opposite direction to that described in connection with Fig. 3.

It also follows that if the electrical constants of a suitable phasing device, such as 71, are properly chosen and the voltage from such phasing device be used as a time base voltage, a phase shift of substantially 90 degrees may be produced in the time base voltage. In this case, the traces $a$, $b$, $c$ and $d$, shown in Fig. 3 will be rotated by 90 degrees, causing the mirror images $b$ and $d$ of the resonance curve of the circuit under test, formed during the falling of modulation frequency, to be traced in the central portion of the screen. In that case traces $a$ and $c$ would be in the positions now shown in Fig. 3 to be occupied by traces $b$ and $d$, and traces $b$ and $d$ would assume the positions now occupied by traces $a$ and $c$. Hence, it will be seen that by the adjusting devices herein provided the pair of traces to be superposed in the central portion of the screen may be selected to be formed during either frequency sense, i. e., during rising or during falling frequency.

As explained in connection with the block diagram of Figure 1, the identity of the source ensures perfect synchronism between the time-base frequency $f_0$ impressed on the horizontal deflecting elements 66 and 67 and the rate of change, $2f_0$, of the test frequency impressed on the vertical deflecting elements 64 and 65, and therefore between the vertical and horizontal motions of the cathode beam and resulting bright spot, controlled respectively thereby.

The combination of the vertical and horizontal displacements of the spot of light as above described will, by reason of persistence of vision of the observer or retention of luminosity of the excited portions of the screen, produce a visible luminous pattern. The unique properties of the pattern produced in accordance with this invention will be understood from the following description of the events which take place when the testing apparatus is properly adjusted and put into operation in connection with a specific numerical example.

Let $f_0$ be 60 cycles per second, and let the design of the oscillator circuit be such that when the average current flows through winding 35, the frequency of the output voltage impressed on transformer 27 is 600 kilocycles per second. Let it be desired to test a radio receiver whose selective circuits are tuned to be resonant at 1000 kilocycles and so sharply tuned that the current through it is, for a constant impressed voltage, reduced substantially to zero both at 990 and at 1010 kilocycles. Let it be desired to investigate the resonant frequency and the width of the pass band of the receiver. In this case, the frequency $f_2$ of the second oscillator should be adjusted to 1600 kilocycles per second. Due to the current variation in the winding 35, the frequency of the output voltage appearing at terminals 55, 56, 57 will vary 12 kilocycles on either side of $f_1$; that is to say, $f_1 \pm 2f_0$ varies from 588 to 612 kilocycles per second, and $f_2-f_1 \pm 2f_0$ varies between 988 and 1012. The rate at which this variation of the test frequency takes place is $2f_0$, or 120 cycles per second, and this is the rate at which the successive vertical excursions of the spot of light on the fluorescent screen recur. On the other hand, the rate at which the spot moves across the screen and back in a horizontal direction, the time-base frequency, is $f_0$, or 60 cycles per second.

It will now be understood that, when the instrument has been properly adjusted for magnitude and phase of the vertical and horizontal deflecting voltages, the following events, which may most easily be understood by reference to Figure 3, will take place.

1. The spot of light approaches the center portion of the screen from the left when the voltage impressed on the receiver under test has its lowest frequency value, 988 kilocycles per second. The reactance of the tuned circuits of the device under test at this frequency is great, and no appreciable vertical deflection takes place. As the spot moves in one direction, i. e., to the right, the frequency of the current through the tuned circuits increases, and the vertical deflection begins to be appreciable when a frequency of about 995 kilocycles is reached, and attains its greatest value at 1000 kilocycles. If the phase adjustment is correct, this occurs at the center of the screen. The frequency continues to increase and the spot continues to move to the right while the vertical deflection diminishes and becomes inappreciable as the frequency passes through 1005 kilocycles per second. Shortly thereafter the test frequency reaches its maximum value of 1012 kilocycles per second, and the spot approaches the right-hand marginal portion of the screen. The trace of the spot of light on the screen will appear, due to persistence of vision, somewhat as in Figure 3 at $a$. For simplicity, the illustrated curve has been drawn as symmetrical, although in practice it would frequently be unsymmetrical and might have a wider base than shown.

2. The spot of light continues for a short space and, when the horizontal deflecting voltage reaches its maximum value, halts and returns. During this period, the frequency falls from 1012 to 988 kilocycles per second, and a vertical deflection takes place. Since it takes place while the beam is reversing its horizontal motion, it does not give rise to a resonance curve which may be interpreted, but merely to a substantially vertical line illustrated at $b$. If the curve is unsymmetrical as above suggested, or if it has a somewhat wider base then shown, the vertical line represented at $b$ (and at $d$) will probably appear as a distorted curve having two sides or slopes. If desired, this event may be caused to take place off the screen, but its presence on the marginal portion of the screen affords certain distinct advantages hereinafter described.

3. A complete cycle of the vertical motion has now taken place, but only one-half cycle of the horizontal motion. The spot next enters the center portion of the screen from the right and travels across it in the opposite direction, i. e., from right to left while the frequency variation and resulting vertical deflection take place as above described under 1, i. e., on the up-sweep or frequency rise in modulation voltage, the deflection having its greatest value at the center of the screen and the trace appearing as at $c$ of Figure 3. Here as at $a$ the curve is shown as symmetrical. If curve $a$ be unsymmetrical curve $c$ will be likewise, and will be a back-to-back duplicate, i. e., a mirror image of the exact curve of $a$. This would not be true if curve $a$ were traced in one frequency sense, i. e., on the up-sweep and curve $c$ on another frequency sense, i. e., on the down-sweep, because it is well recognized in the art that resonance curves, for example, are usually steeper with rising frequency than with falling frequency. The spot continues its progress to the left, approaching the marginal portion of the screen as the test frequency again reaches its greatest value.

4. The spot continues to the left, halts, and returns in the first direction, to the right, while the frequency falls from 1012 to 988 kilocycles per second. Substantially the same vertical deflection takes place at $d$ as at $b$, and therefore the curve (if any) traced at $d$ is a mirror image of that traced at $b$.

The resonance curve traces $a$ and $c$ of Figure 3 may be considered as two events which take place during a complete cycle of horizontal spot motion. They are separated by a full cycle or 360 degrees from the standpoint of the higher frequency $2f_0$ and therefore by exactly one half cycle or 180 degrees, from the standpoint of the horizontal time-base frequency $f_0$. This is true independent of their positions on the screen. They may therefore appear in partial or complete superposition only when each is at the center of the screen. Now since in the case of both the traces $a$ and $c$ the frequency is rising, these events will take place later in the cycle if the device under test be tuned to too high a frequency, and they will both take place earlier if it be tuned too low. It follows that a receiver which is mistuned to too high a frequency will present two response curve traces, the first one, due to rightward spot motion, being shifted to the right of the center of the screen, and the second one, due to leftward spot motion, being shifted by an equal amount to the left. Similarly, a receiver which is tuned too low will present two traces shifted in the reverse directions. Thus, mistuning, either to too high or too low a frequency will be reflected in and indicated by a shift of one trace to one side of the center of the screen by a certain amount, and a shift of the other trace to the other side of the center by an equal amount, so that the relative displacement of the two traces, i. e., the distance between corresponding points thereof, is a direct measure of the degree to which the device under test is mistuned, the two traces becoming centered or superposed when and only when the device under test is correctly adjusted. That the two images can be superposed will be understood when it is appreciated that they are actually two images of the same curve reversed, and are not two different curves, as they would be were they produced from successive rising and falling frequency sweeps.

Like the principal resonance curve traces, the distorted traces indicated at $b$ and $d$ of Figure 3 are always separated in phase by exactly 180°, from the standpoint of the horizontal time-base frequency $f_0$. They appear as substantially vertical lines, or distorted traces, near the extremity of the horizontal excursion of the spot of light. When the receiver under test is correctly tuned, they occur exactly at either end of the horizontal excursion. In the case of an incorrectly tuned receiver, they are slightly advanced and delayed respectively, which results in a phase shift and displacement from the true endpoints of the excursion of the same character as the displacement of the principal resonance curve traces from the center of the screen. As may be realized with the aid of the familiar fiction that cathode-ray tube traces are drawn on a transparent vertical cylinder, these vertical lines are viewed edgewise, and therefore a slight phase displacement will not be observed.

Figure 4:
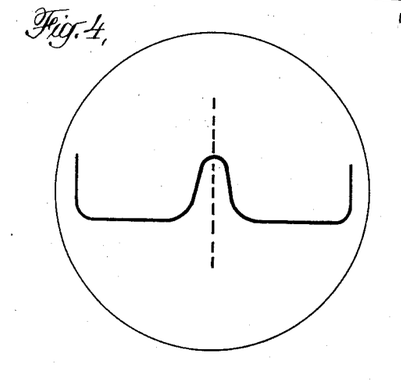
Figure 4 shows the appearance on the screen of a cathode-ray oscilloscope according to the invention, of the response characteristic of a simple tuned circuit, when correctly tuned.
Figure 5:
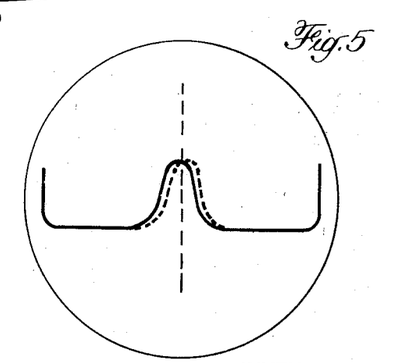
Figure 5 shows the response characteristic of a simple tuned circuit slightly mistuned and its "image" as produced in accordance with the invention.

The advantages of my invention will now be apparent. Assuming that the receiver whose resonance curve has been traced as above described was perfect in all respects and that the testing apparatus was correctly adjusted, the rightward and the leftward curves will both reach their peaks at 1000 kilocycles, and the pass band will be just 10 kilocycles wide. Using this receiver as a standard, the frequency $f_2$ and the phase of the horizontal deflecting voltage may be adjusted until the rightward and the leftward curves are partially or completely superposed at the center of the screen. This condition is illustrated in Figure 4. If now a second receiver, intended to satisfy the same requirements, be substituted for the first one, and if it be slightly mistuned, say to too high a frequency by only one kilocycle per second, both of the traces will occur later in time, which results in the rightward curve being shifted to the right of the center of the screen and the leftward one to the left of the center. This condition is illustrated in Figure 5, where the dotted line indicates the rightward curve and the solid line the leftward one. Evidently, a minute misalignment or maladjustment of the device under test is thus rendered strikingly apparent by the failure of the two curves to superpose. Points on the two curves at the same altitude are separated from each other by twice the distance by which either curve is displaced from its proper central position on the screen, and the resulting precision is far greater than has heretofore been obtainable. The improvement over the single trace of test devices heretofore known is obvious.

The purpose served by the falling frequency traces at either end of the horizontal excursion is to check the adjustment of the testing apparatus. If the phase relations between horizontal deflecting voltage and frequency wobble are correct, these will appear simply as substantially vertical lines, or traces compressed to a minimum, close to the margins of the screen. If the phase adjustments are not correct, they will appear as distorted loops, their separation being somewhat reduced. Thus the operator is enabled to be continuously aware of the correctness of the phase adjustments of the testing apparatus, even during the course of a test on a receiver or circuit device.

I have described my invention in connection with a cathode-ray oscilloscope principally for the reason that a device of this type is operative at the high frequencies at which my invention at present has its chief utility. There is manifestly no objection to employing an oscilloscope of any type having a sufficient response in the desired frequency range. Whatever type of oscilloscope may be employed, I contemplate the use of any means of obtaining a proper frequency-modulated voltage to be impressed on the device under test.

Exact proportionality of beam deflection to the voltage or current producing it is in no sense an essential part of my invention, since any suitable relation is sufficient. Therefore, when in this specification and in the appended claims I refer to deflection of the cathode beam in proportion to a voltage, or the like, I do not intend a necessarily precise mathematical relation. As I employ the expression "in proportion to", it is to be taken as the substantial equivalent of the expression "in accordance with" or the like.

Having now described my invention I claim:

1. The method of determining directly the frequency-response characteristic of an electric circuit device with a cathode-ray oscilloscope developing a cathode beam and having a fluorescent screen and vertical and horizontal deflecting elements, by visual observation of luminous traces whose presence on said screen is due to deflection of said beam, and whose configurations are descriptive of said characteristic, which comprises providing a first voltage of a certain first frequency, deriving from said first voltage a second voltage of a second frequency twice said first frequency, providing a third voltage of a certain third frequency, frequency-modulating said third voltage at said second frequency, impressing a voltage related to said frequency-modulated third voltage on an electric circuit device under test, rectifying the electric current response of said device to said impressed voltage, producing vertical deflection of the cathode beam in proportion to said rectified current, and producing horizontal deflection of said beam in related accordance with said first voltage and at said first frequency, whereby a first luminous trace of the frequency-response curve of said device under test is produced by horizontal movement of the beam in one direction with change of said second frequency in one sense, and a second luminous trace which is the mirror image of said first trace is produced by horizontal movement of said beam in the opposite direction with a substantially identical change of said second frequency.

2. In testing apparatus for determining directly the frequency-response characteristic of an electric circuit device having input terminals and output terminals, by visual observation of cathode beam-produced luminous traces whose configurations are descriptive of said characteristic, the combination of a cathode ray oscilloscope adapted to develop a cathode beam, and having a fluorescent screen and vertical and horizontal deflecting elements, with a source of a first voltage of a low first frequency, means for deriving from said first voltage a second voltage of a second frequency twice said first frequency, a source of a third voltage of a high third frequency, means for frequency-modulating said third voltage at said second frequency, means for impressing a voltage related to said frequency-modulated voltage on the input terminals of an electric circuit device under test, a rectifier connected to the output terminals of said device, a circuit arrangement including the vertical deflecting elements of the oscilloscope adapted to vertically deflect the cathode beam developed by the oscilloscope in proportion to the output current of said rectifier, and a circuit arrangement including the horizontal deflecting elements of the oscilloscope adapted to impart reciprocating horizontal motion to the cathode beam in related acordance with said first voltage and at said first frequency, said combination being adapted to produce a first luminous trace of the frequency-response curve of said device under test by horizontal movement of the beam in one direction with change of said second frequency in one sense, and to produce a second luminous trace which is the mirror image of said first trace by horizontal movement of said beam in the opposite direction with a substantially identical change of said second frequency.

3. The method of determining directly the frequency-response characteristic of an electric circuit device with a cathode-ray oscilloscope developing a cathode beam and having a fluorescent screen and vertical and horizontal deflecting elements, by visual observation of luminous traces whose presence on said screen is due to deflection of said beam and whose configurations are descriptive of said characteristic, which comprises providing a first voltage of a certain first frequency, deriving from said first voltage a second voltage of a second frequency twice said first frequency, providing a third voltage of a certain third frequency, frequency-modulating said third voltage at said second frequency, providing a fourth voltage of a certain fourth frequency, amplitude-modulating said fourth voltage with the voltage resulting from said frequency-modulation, impressing the voltage resulting from said successive modulations on an electric circuit device under test, rectifying the electric current response of said device to said impressed voltage, producing vertical deflection of the cathode beam in proportion to said rectified current, and producing horizontal deflection of said beam in related accordance with said first voltage and at said first frequency, whereby a first luminous trace of the frequency-response curve of said device under test is produced by rightward movement of the beam with rising frequency, and a second luminous trace of the mirror image of said frequency-response curve is produced by leftward movement of the beam with rising frequency.

4. The method of determining directly the frequency-response characteristic of electric apparatus including a rectifier and having input terminals, with a cathode-ray oscilloscope developing a cathode beam and having a fluorescent screen and vertical and horizontal deflecting elements, by visual observation of luminous traces whose presence on said screen is due to deflection of said beam and whose configurations are descriptive of said characteristic, which comprises providing a first voltage of a certain first frequency, deriving from said first voltage a second voltage of a second frequency twice said first frequency, providing a third voltage of a certain third frequency, frequency-modulating said third voltage at said second frequency, impressing a voltage related to said frequency-modulated voltage on the input terminals of the electric apparatus under test, producing vertical deflection of the cathode beam in proportion to the output voltage of said apparatus, and producing horizontal deflection of said beam in related accordance with said first voltage and at said first frequency, whereby a first luminous trace of the frequency-response curve of said device under test is produced by horizontal movement of the beam in one direction with change of said second frequency in one sense, and a second luminous trace which is the mirror image of said first trace is produced by horizontal movement of said beam in the opposite direction with a substantially identical change of said second frequency.

5. The method of determining directly the frequency-response characteristic of an electric circuit device with a cathode-ray oscilloscope developing a cathode beam and having a fluorescent screen and vertical and horizontal deflecting elements, by visual observation of luminous traces whose presence on said screen is due to deflection of said beam and whose configurations are descriptive of said characteristic, which comprises providing an alternating time base voltage of a certain frequency, providing a second alternating voltage, varying the frequency of said second voltage at a rate double the frequency of said time base voltage and in synchronism therewith, whereby to produce a test voltage, impressing said test voltage on the electric circuit device under test, impressing on the vertical deflecting elements of said oscilloscope a voltage proportional to the current response of said device to said test voltage, and impressing said time base voltage on the horizontal deflecting elements of the oscilloscope, whereby two substantially stationary luminous traces appear centered on the screen if said device has desired characteristics, and two luminous traces appear shifted horizontally in opposite directions on said screen if said device has undesired characteristics.

6. The method of determining directly the frequency-response characteristic of an electric circuit device with a cathode-ray oscilloscope developing a cathode beam and having a fluorescent screen and vertical and horizontal deflecting elements, by visual observation of a luminous pattern whose presence on said screen is due to deflection of said beam and whose configurations are descriptive of said characteristic, which comprises providing a first voltage of a certain first frequency and a certain phase, deriving from said first voltage a second voltage of a second frequency twice said first frequency and of a certain phase, providing a third voltage of a certain third frequency, frequency-modulating said third voltage at said second frequency, impressing a voltage related to said frequency-modulated voltage on the electric circuit device under test, rectifying the electric current response of said device to said impressed voltage, producing vertical deflection of the cathode beam in proportion to said rectified current, producing horizontal deflection of said beam in related accordance with said first voltage and at said first frequency, and adjusting the relation between the phases of said first voltage and said second voltage, to produce a luminous pattern on said screen comprising two frequency-response curve traces descriptive of the device under test at the center portion of said pattern, and an end trace at each end horizontally of said pattern which approaches a vertical line trace, the degree of verticality and the mutual separation of said end traces being a measure of the correctness of said phase adjustment.

7. The method of determining directly the frequency-response characteristic of an electric circuit device with a cathode-ray oscilloscope developing a cathode beam and having a fluorescent screen and vertical and horizontal deflecting elements, by visual observation of a luminous pattern whose presence on said screen is due to deflection of said beam and whose configurations are descriptive of said characteristic, which comprises providing a first voltage of a certain first frequency and a certain phase, deriving from said first voltage a second voltage of a second frequency twice said first frequency and of a certain phase, providing a third voltage of a certain third frequency, frequency-modulating said third voltage at said second frequency, providing a fourth voltage of a certain fourth frequency, amplitude-modulating said fourth voltage with the voltage resulting from said frequency-modulation, impressing the voltage resulting from said successive modulations on an electric circuit device under test, rectifying the electric current response of said device to said impressed voltage, producing vertical deflection of the cathode beam in proportion to said rectified current, producing horizontal deflection of said beam in related accordance with said first voltage and at said first frequency, and adjusting the relation between the phases of said first voltage and said second voltage, to produce a luminous pattern on said screen, comprising two frequency-response curve traces descriptive of the device under test at the center portion of said pattern, and an end trace at each end horizontally of said pattern which approaches a vertical line trace, the degree of verticality and the mutual separation of said end traces being a measure of the correctness of said phase adjustment.

8. The method of determining directly the frequency-response characteristic of an electric circuit device with a cathode-ray oscilloscope developing a cathode beam and having a fluorescent screen and vertical and horizontal deflecting elements, by visual observation of luminous traces whose presence on said screen is due to deflection of said beam and whose configurations are descriptive of said characteristic, which comprises providing a first alternating voltage of a certain first frequency, providing a second alternating voltage of variable frequency, varying the frequency of said second voltage between an upper limit and a lower limit at a rate double said first frequency and in synchronism therewith, whereby to produce a test voltage, impressing said test voltage on the device under test, producing vertical deflection of said cathode beam in proportion to the current response of said device to said second voltage, and producing reciprocating horizontal motion of said cathode beam at said first frequency, whereby a first luminous trace of the frequency-response curve of said device under test is produced by horizontal movement of the beam in one direction with change of frequency of said second voltage in one sense, and a second luminous trace which is the mirror image of said first trace is produced by horizontal movement of said beam in the opposite direction with a substantially identical change of frequency of said second voltage.

9. The method of determining directly the frequency-response characteristic of an electric circuit device with a cathode-ray oscilloscope developing a cathode beam and having a fluorescent screen and vertical and horizontal deflecting elements, by visual observation of a luminous pattern whose presence on said screen is due to deflection of said beam and whose configurations are descriptive of said characteristic, which comprises imparting to the cathode beam a reciprocating horizontal motion at a certain rate, producing a test voltage which is modulated at a rate double the said certain rate of said horizontal motion, and imparting to the cathode beam a vertical deflection proportional to the current response of the device under test to said test voltage, to produce on the screen of the oscilloscope a luminous pattern having two portions, the coordinates of one portion of said pattern being proportional to the current response of said device to said test voltage as its frequency increases and to said frequency, respectively, and the coordinates of the other portion of said pattern being proportional to the current response of said device to said test voltage as its frequency increases and to a constant minus said frequency, respectively.

10. The method of determining directly the frequency-response characteristic of an electric circuit device subjected to a frequency-modulated test voltage, with a cathode-ray oscilloscope developing a cathode beam and having a fluorescent screen and vertical and horizontal deflecting elements, by visual observation of luminous traces whose presence on said screen is due to deflection of said beam and whose configurations are descriptive of said characteristic, which comprises causing the cathode beam to trace in rapid succession on said screen two pairs of images of the frequency response curve of said device by tracing one pair of images with rising frequency and the other pair of images with falling frequency whereby the images in each pair comprise mirror images of each other, timing the vertical deflection against the horizontal deflection such that the four images are substantially equally spaced with respect to one complete cycle of horizontal deflection, and adjusting the relative phases of the deflection voltages so that one said pair of images appears in substantially undistorted form in the central portion of said screen and the other pair of images appears compressed at the extremes of horizontal deflection of said beam.

11. In testing apparatus for determining directly the frequency-response characteristic of an electric circuit device having input terminals and output terminals by visual observation of cathode beam-produced luminous traces whose configurations are descriptive of said characteristic, the combination of a cathode ray oscilloscope having vertical and horizontal deflecting elements and a fluorescent screen, and adapted to develop a spot of light on said screen, with a low frequency source of alternating current, a first space discharge tube oscillator having a plurality of electrodes, a second space discharge tube oscillator having a plurality of electrodes, a full-wave rectifier, a saturable reactor, tuned circuit means insluding said saturable reactor and connected to the electrodes of said first oscillator for determining the frequency of oscillation of said first oscillator, means including a ferromagnetic core and said full-wave rectifier for varying the saturation of said saturable reactor in related accordance with the current output of said rectifier, means including electrodes of said second oscillator for hodulating the output of said second oscillator by the output of said first oscillator to produce a test voltage, means for impressing said test voltage on the input terminals of the electric circuit device under test, a circuit arrangement including the vertical deflecting elements of the cathode-ray oscilloscope for producing vertical displacement of the spot of light on the screen of the oscilloscope in proportion to the current response of said device to said test voltage, and a circuit arrangement including the horizontal deflecting elements of the cathode-ray oscilloscope for producing reciprocating horizontal motion of the spot of light on the screen of the oscilloscope at the frequency of said low-frequency source, said combination being adapted to produce a first luminous trace of the frequency-response curve of said device under test by rightward movement of the spot of light with rising frequency, and a second luminous trace of the mirror image of said frequency-response curve by leftward movement of the spot of light with rising frequency.

12. In testing apparatus for determining directly the frequency-response characteristic of an electric circuit device by visual observation of cathode beam-produced luminous traces whose configurations are descriptive of said characteristic, the combination of a cathode ray oscilloscope adapted to develop a cathode beam, and having a fluorescent screen and vertical and horizontal deflecting elements, with a low-frequency source of alternating current, a space discharge tube oscillator, a tuned circuit in cooperative relation with said oscillator, a variable reactor connected in said tuned circuit, a full-wave rectifier supplied by said low-frequency source, means for varying the reactance of said reactor in related accordance with the output voltage of said rectifier, means for impressing a voltage related to the output voltage of said oscillator on the electric circuit device under test, a circuit arrangement including the vertical deflecting elements of the oscilloscope, adapted to vertically deflect the cathode beam of the oscilloscope in proportion to the output current of the device under test, and a circuit arrangement including the horizontal deflecting elements of the oscilloscope, adapted to impart reciprocating horizontal motion to the cathode beam at said first frequency, said combination being adapted to produce a first luminous trace of the frequency-response curve of said device under test by rightward movement of the beam with rising frequency, and a second luminous trace of the mirror image of said frequency-response curve by leftward movement of the beam with rising frequency.

13. In testing apparatus for determining directly the frequency-response characteristic of an electric-circuit device subjected to a frequency-modulated test voltage, by visual observation of a cathode beam-produced luminous pattern whose configurations are descriptive of said characteristic, the combination of a cathode ray oscilloscope adapted to develop a cathode beam and having a fluorescent screen and vertical and horizontal deflecting elements, with a first oscillator, a frequency-modulator, an amplitude-modulator, said electric circuit device under test and a rectifier having an output circuit, coupled to each other in the order named, a second oscillator coupled to said amplitude-modulator, a source of alternating current, a frequency-doubler, a phase-control device and said frequency modulator, coupled to each other in the order named, electrical connections from the output circuit of said rectifier to the vertical deflecting elements of the oscilloscope, and electrical connections from said source to the horizontal deflecting elements of the oscilloscope, said combination being adapted to produce on the screen of the oscilloscope a luminous pattern having two portions, the coordinates of one portion of said pattern being proportional to the current response of said device under test to said test voltage as its frequency increases and to said frequency, respectively, and the coordinates of the other portion of said pattern being proportional to the current response of said device under test to said test voltage as its frequency increases and to a constant minus said frequency, respectively.

14. In testing apparatus for determining directly the frequency-response characteristic of an electric-circuit device subjected to a frequency-modulated test voltage, by visual observation of a cathode beam-produced luminous pattern whose configurations are descriptive of said characteristic, the combination of a cathode ray oscilloscope adapted to develop a cathode beam and having a fluorescent screen and vertical and horizontal deflecting elements, with a first oscillator, a frequency-modulator, said electric circuit device under test and a rectifier having an output circuit, coupled to each other in the order named, a source of alternating current, a frequency-doubler, a phase-control device and said frequency-modulator, coupled to each other in the order named, electrical connections from the output circuit of said rectifier to the vertical deflecting elements of the oscilloscope, and electrical connections from said source to the horizontal deflecting elements of the oscilloscope, said combination being adapted to produce on the screen of the oscilloscope a luminous pattern having two portions, the coordinates of one portion of said pattern being proportional to the current response of said device under test to said test voltage as its frequency increases and to said frequency, respectively, and the coordinates of the other portion of said pattern being proportional to the current response of said device under test to said test voltage as its frequency increases and to a constant minus said frequency, respectively.

15. In testing apparatus for determining directly the frequency-response characteristic of an electric circuit-device having input terminals and output terminals, by visual observation of cathode beam-produced luminous traces whose configurations are descriptive of said characteristic, the combination of a cathode ray oscilloscope adapted to develop a cathode beam, and having a fluorescent screen and vertical and horizontal deflecting elements, with a source of a first voltage of a low first frequency, means for deriving from said first voltage a second voltage of a second frequency twice said first frequency, a source of a third voltage of a third frequency higher than said second frequency, means for frequency-modulating said third voltage at said second frequency, a source of a fourth voltage of a fourth frequency higher than said third frequency, means for amplitude-modulating said fourth voltage with the voltage resulting from said frequency modulation, means for impressing the voltage resulting from said successive modulations on the input terminals of an electric circuit device under test, a rectifier connected to the output terminals of said device, a circuit arrangement including the vertical deflecting elements of the oscilloscope adapted to vertically deflect the cathode beam developed by the oscilloscope in proportion to the output current of said rectifier, a circuit arrangement including the horizontal deflecting elements of the oscilloscope adapted to impart reciprocating horizontal motion to the cathode beam in related accordance with said first voltage and at said first frequency, said combination being adapted to produce a first luminous trace of the frequency-response curve of said device under test by horizontal movement of the beam in one direction with change of said second frequency in one sense, and to produce a second luminous trace which is the mirror image of said first trace by horizontal movement of said beam in the opposite direction with a substantially identical change of said second frequency.

16. In testing apparatus for determining directly the frequency-response characteristic of electric apparatus including a rectifier and having input terminals, by visual observation of cathode beam-produced luminous traces whose configurations are descriptive of said characteristic, the combination of a cathode-ray oscilloscope adapted to develop a cathode beam and having a fluorescent screen and vertical and horizontal deflecting elements, with a source of a first voltage of a certain first frequency, means for deriving from said first voltage a second voltage of a second frequency twice said first frequency, a source of a third voltage of a certain third frequency, means for frequency-modulating said third voltage at said second frequency, means for impressing a voltage related to said frequency-modulated voltage on the input terminals of the electric apparatus under test, a circuit arrangement including the vertical deflecting elements of the oscilloscope adapted to vertically deflect the cathode beam developed by the oscilloscope in accordance with the output current of said apparatus, and a circuit arrangement including the horizontal deflecting elements of the oscilloscope adapted to impart reciprocating horizontal motion to the cathode beam in related accordance with said first voltage and at said first frequency, said combination being adapted to produce a first luminous trace of the frequency-response curve of said device under test by horizontal movement of the beam in one direction with change of said second frequency in one sense and to produce a second luminous trace which is the mirror image of said first trace by horizontal movement of said beam in the opposite direction with a substantially identical change of said second frequency.

17. The method of determining directly the frequency-response characteristic of an electric circuit device with an oscilloscope developing a beam of rays and having a screen and vertical and horizontal deflecting means, by visual observation of luminous traces whose presence on said screen is due to deflection of said beam and whose configurations are descriptive of said characteristic, which comprises providing a first alternating voltage of a certain first frequency, providing a second alternating voltage of variable frequency, producing reciprocating horizontal motion of said beam at said first frequency, varying the frequency of said second voltage between an upper limit and a lower limit at a rate double said first frequency and in synchronism therewith, impressing a test voltage related to said frequency-varied second voltage on the device under test, producing vertical deflection of said beam in proportion to the current response of said device to said test voltage, tracing on said screen a first luminous trace of the frequency-response curve of said device under test by horizontal movement of the beam in one direction with change of frequency of said second voltage in one sense, and tracing a second luminous trace of the mirror image of said first trace by horizontal movement of said beam in the opposite direction with a substantially identical change of frequency of said second voltage.

GARLAND W. ARCHER.